(12) United States Patent
Yoshida

(10) Patent No.: US 10,445,444 B2
(45) Date of Patent: Oct. 15, 2019

(54) FLOW RATE PREDICTION DEVICE, MIXING RATIO ESTIMATION DEVICE, METHOD, AND COMPUTER-READABLE RECORDING MEDIUM

(71) Applicant: NEC Corporation, Minato-ku, Tokyo (JP)

(72) Inventor: Hiroshi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 262 days.

(21) Appl. No.: 15/329,632

(22) PCT Filed: Jul. 29, 2015

(86) PCT No.: PCT/JP2015/003822
§ 371 (c)(1),
(2) Date: Jan. 27, 2017

(87) PCT Pub. No.: WO2016/017171
PCT Pub. Date: Feb. 4, 2016

(65) Prior Publication Data
US 2017/0220711 A1    Aug. 3, 2017

(30) Foreign Application Priority Data

Aug. 1, 2014   (JP) ................................ 2014-157743

(51) Int. Cl.
*G06F 17/50* (2006.01)
*G06N 5/04* (2006.01)
(Continued)

(52) U.S. Cl.
CPC ........... *G06F 17/5009* (2013.01); *G06N 5/04* (2013.01); *H04L 41/142* (2013.01); *H04L 41/147* (2013.01); *H04L 43/0894* (2013.01)

(58) Field of Classification Search
CPC ...... G06F 17/5009; G06N 5/04; H04L 41/142
(Continued)

(56) References Cited

U.S. PATENT DOCUMENTS 7,561,991 B2 *   7/2009   Matsunaga ............. G06F 17/18
                                                 703/2
7,594,260 B2 *   9/2009   Porras ................... H04L 41/142
                                                 709/224

(Continued)

FOREIGN PATENT DOCUMENTS

JP    2013-069141 A    4/2013
WO    2014/007166 A1   1/2014

OTHER PUBLICATIONS

Paul et al. ("Understanding Traffic Dynamics in Cellular Data Networks", IEEE INFOCOM 2011, pp. 882-890) (Year: 2011).*

(Continued)

*Primary Examiner* — Kamini S Shah
*Assistant Examiner* — Iftekhar A Khan

(57) ABSTRACT

Communication throughput or fluctuations therein is more accurately predicted. A flow rate prediction device of the present invention is provided with: a stationarity discerning means for discerning whether the state of fluctuation in a flow rate is a steady state or non-steady state, on the basis of flow rate time series data; a mixing ratio estimating means which uses the discernment result, a mixing ratio fluctuation model, and a discernment result observation model, and which estimates the mixing ratio in the flow rate in a designated duration; and a model mixing means for mixing a steady model and a non-steady model, on the basis of the estimated mixing ratio, to construct a mixed model.

6 Claims, 12 Drawing Sheets

(51) Int. Cl.
*H04L 12/24* (2006.01)
*H04L 12/26* (2006.01)

(58) Field of Classification Search
USPC .............................................. 703/9
See application file for complete search history.

(56) References Cited

U.S. PATENT DOCUMENTS

| | | | | |
|---|---|---|---|---|
| 7,716,022 | B1* | 5/2010 | Park | G06Q 10/10 |
| | | | | 702/181 |
| 8,260,652 | B1* | 9/2012 | Silver | G06Q 10/06 |
| | | | | 705/7.28 |
| 8,635,175 | B2* | 1/2014 | Dieker | G06N 7/005 |
| | | | | 706/14 |
| 8,762,302 | B1* | 6/2014 | Spivack | G06N 5/046 |
| | | | | 706/12 |
| 9,104,641 | B2* | 8/2015 | Aoki | G01S 19/39 |
| 9,453,911 | B2* | 9/2016 | Shiba | G01S 13/726 |
| 9,524,365 | B1* | 12/2016 | Liu | G06F 17/5081 |
| 9,722,892 | B2* | 8/2017 | Yoshida | H04L 47/823 |
| 2003/0125887 | A1* | 7/2003 | Ogawa | G01D 1/14 |
| | | | | 702/66 |
| 2007/0072614 | A1* | 3/2007 | Forsberg | H04W 36/30 |
| | | | | 455/436 |
| 2010/0130206 | A1* | 5/2010 | Chin | H04W 36/30 |
| | | | | 455/436 |
| 2010/0241639 | A1* | 9/2010 | Kifer | G06F 16/345 |
| | | | | 707/754 |
| 2011/0137833 | A1* | 6/2011 | Ide | G06N 7/005 |
| | | | | 706/12 |
| 2012/0023041 | A1* | 1/2012 | Kariv | G06F 11/3447 |
| | | | | 706/12 |
| 2013/0034000 | A1* | 2/2013 | Huo | H04L 25/03343 |
| | | | | 370/252 |
| 2013/0091137 | A1* | 4/2013 | Aust | G06F 16/35 |
| | | | | 707/737 |
| 2013/0343216 | A1* | 12/2013 | Su | H04W 24/10 |
| | | | | 370/252 |
| 2015/0180740 | A1* | 6/2015 | Yoshida | H04L 47/823 |
| | | | | 370/252 |
| 2015/0229456 | A1* | 8/2015 | Wild | H04B 7/024 |
| | | | | 375/295 |
| 2015/0333808 | A1* | 11/2015 | Onodera | H04B 7/024 |
| | | | | 370/329 |

OTHER PUBLICATIONS

Bui et al. ("A Model for Throughput Prediction for Mobile Users",European Wireless 2014, pp. 1-6) (Year: 2014).*

Serkan Zeytun ("Stochastic Volatility, a New Approach for Vasicek Model with Stochastic Volatility", The Middle East Technical University, 2005, pp. 1-60) (Year: 2005).*

Doucet et al. ("On sequential Monte Carlo sampling methods for Bayesian filtering", Statistics and Computing (2000) 10, 197-208) (Year: 2000).*

Hiroshi Yoshida and Kozo Satoda, "Stationarity Analysis and Prediction Model Construction of TCP Throughput by using Application-Level Mechanism", The Technical Report of the Proceeding of the Institute of Electronics, Information and Communication Engineers, vol. 112, No. 352, IN2012-128, Dec. 2012, p. 39-44.

Kozo Satoda, et al., "Network Traffic Estimation and Prediction Technologies for Improving User-perceived Quality", The Technical Report of the Proceeding of the Institute of Electronics, Information and Communication Engineers, Nov. 7, 2013, vol. 113 No. 294, pp. 31-36. (Cited in ISR).

Hiroshi Yoshida et al., "Estimating a State of TCP Throughput by using a Particle Filter", The Technical Report of the Proceeding of the Institute of Electronics, Information and Communication Engineers, Sep. 4, 2014, vol. 114, No. 207, pp. 141 to 146. (Cited in ISR).

International Search Report for PCT Application No. PCT/JP2015/003822, dated Aug. 25, 2015.

English translation of Written opinion for PCT Application No. PCT/JP2015/003822.

* cited by examiner

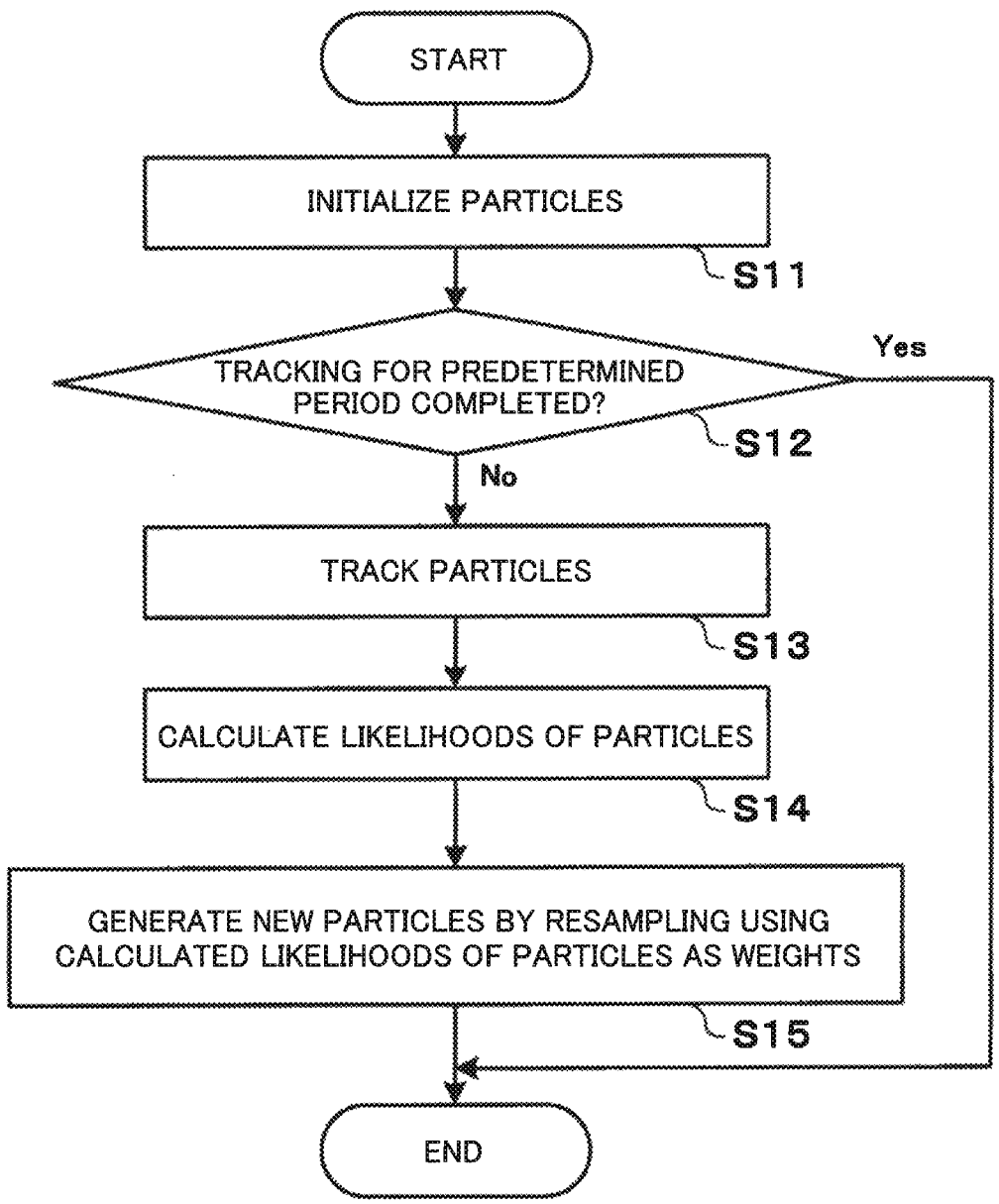

Fig.9

---
Algorithm 1 Generate and track particles
---
1: for $i = 1$ to $N$ do
2: $\quad r_{0|0}^{(i)} \sim p_0(r) = \mathcal{U}(0,1)$ // GENERATION OF INITIAL PARTICLES
3: end for
4: for $t = 1, 2, 3, \cdots$ do
5: $\quad$ for $i = 1$ to $N$ do
6: $\quad\quad r_{t|t-1}^{(i)} \sim p(r_t | r_{t-1|t-1}^i)$ // TRACKING OF PARTICLES
7: $\quad\quad w_t^{(i)} = p(u_t | r_{t|t-1}^{(i)})$ // LIKELIHOODS OF PARTICLES (=WEIGHTS)
8: $\quad$ end for
9: $\quad W_t = \sum_{i=1}^{N} w_t^{(i)}$ // TOTAL SUM OF WEIGHTS
10: $\quad$ Resampling $\{r_{t|t}^{(i)}\}$ from $\{r_{t|t-1}^{(i)}\}$ with a probability $\frac{w_t^{(i)}}{W_t}$
$\quad\quad$ // GENERATION OF NEW PARTICLES BY RESAMPLING
11: end for
---

FLOW RATE PREDICTION DEVICE, MIXING RATIO ESTIMATION DEVICE, METHOD, AND COMPUTER-READABLE RECORDING MEDIUM

This application is a National Stage Entry of PCT/JP2015/003822 filed on Jul. 29, 2015, which claims priority from Japanese Patent Application 2014-157743 filed on Aug. 1, 2014, the contents of all of which are incorporated herein by reference, in their entirety.

TECHNICAL FIELD

The present invention relates to a flow rate prediction device, a flow rate prediction method, and a flow rate prediction program that predict a flow rate and a mixing ratio estimation device, a mixing ratio estimation method, and a computer-readable recording medium that estimate a mixing ratio of a steady state to a non-steady state in the state of fluctuation in the flow rate.

BACKGROUND ART

Communication throughput prediction devices that predict communication throughput, which is a size of data (amount of data) that are transferred (transmitted) by way of a communication network per unit time, have been used.

Communication throughput fluctuates due to various causes. For example, the communication throughput of a best-effort network, such as the Internet or a mobile network, changes moment by moment because of complicated interaction from various causes, such as influence from cross traffic and changes in the radio wave condition.

On the other hand, communication throughput substantially influences the quality of services provided in cloud services and the like, which are provided on best-effort networks. Thus, for telecommunication carriers, predicting communication throughput and fluctuation therein with high accuracy is one of the important challenges.

With regard to technologies for predicting communication throughput, in PTL 1, for example, a method for discerning whether the state of communication throughput is in a stable state (stable state) or an unstable state (non-stable state) is described. Specifically, a communication throughput prediction device described in PTL 1 performs stationarity discernment using a unit root test on time series data of communication throughput to discern whether the state of communication throughput is in a stable state or a non-stable state. On the basis of the obtained stationarity discernment result for the state of communication throughput, the communication throughput prediction device identifies a prediction model of communication throughput.

In NPL 1, for example, a method for calculating the mixing ratio included in the state of communication throughput, which is based on the assumption that the state of communication throughput is not simply categorized into either a steady state or a non-steady state, and in actuality, is brought to a state into which a steady state and a non-steady state are mixed at a certain proportion (referred to as a mixing ratio), is described. Specifically, a communication throughput prediction device described in NPL 1 employs, as a mixing ratio, an exponentially smoothed moving average (that is, a real value not less than 0 and not greater than 1), which is obtained by applying a smoothing filter to discernment result time series data in which stationarity discernment results for the state of communication throughput are arranged in a time series. On the basis of the mixing ratio obtained in such a way, the communication throughput prediction device mixes a steady model and a non-steady model to construct a prediction model of communication throughput.

CITATION LIST

Patent Literature

[PTL 1] PCT International Publication No. WO 2014/007166 A

Non Patent Literature

[NPL 1] Hiroshi Yoshida and Kozo Satoda, "Stationarity Analysis and Prediction Model Construction of TCP Throughput by using Application-Level Mechanism", The Technical Report of The Proceeding of The Institute of Electronics, Information and communication Engineers, vol. 112, no. 352, IN2012-128, December, 2012, p. 39-44.

SUMMARY OF INVENTION

Technical Problem

However, there is a problem in that, since the communication throughput prediction device described in PTL 1 categorizes the state of communication throughput into either a steady state or a non-steady state, the prediction accuracy of communication throughput is reduced when the communication throughput prediction device is applied to a communication environment or a time domain in which the state of communication throughput may be put in a state into which a steady state and a non-steady state are mixed.

Since, in the method described in NPL 1, a mixing ratio is further calculated based on a result from the stationarity analysis and a mixed model into which the steady model and the non-steady model are mixed at the calculated mixing ratio is used as a prediction model of communication throughput, the prediction accuracy of communication throughput may be improved even in a communication environment or a time domain in which the state of communication throughput may be brought to a state into which a steady state and a non-steady state are mixed. However, the estimation method of a mixing ratio described in NPL 1, that is, a method in which a smoothing filter is used, is not a best estimation method of a mixing ratio.

Accordingly, an object of the present invention is to provide a flow rate prediction device, a flow rate prediction method, and a flow rate prediction program that may predict communication throughput or fluctuation therein with higher accuracy. In addition, a principal object of the present invention is to provide a mixing ratio estimation device, a mixing ratio estimation method, and a mixing ratio estimation program that may estimate a mixing ratio of a steady state to a non-steady state both being included in the state of fluctuation, which represents fluctuation in communication throughput, with higher accuracy.

Solution to Problem

A flow rate prediction device according to an aspect of the present invention includes a stationarity discerning means for, based on flow rate time series data that are time series data of measured values of flow rate, discerning whether the state of fluctuation in the flow rate is a steady state or a non-steady state, a mixing ratio estimating means for, by using a discernment result from the stationarity discerning means, a mixing ratio fluctuation model that models probabilistic fluctuation in a mixing ratio that is a proportion of a steady state to a non-steady state both being included in the state of fluctuation in the flow rate, and a discernment result observation model that indicates a probability that a discernment result from the stationarity discerning means is one predetermined state with respect to any mixing ratio, estimating a mixing ratio of a steady state to a non-steady state both being included in the state of fluctuation in the flow rate at a specified time out of times corresponding to measured values included in the flow rate time series data, and a model mixing means for, based on a mixing ratio estimated by the mixing ratio estimating means, mixing a steady model that represents fluctuation in the flow rate in a steady state and a non-steady model that represents fluctuation in the flow rate in a non-steady state to construct a mixed model that serves as a fluctuation model of the flow rate.

A mixing ratio estimation device according to another aspect of the present invention includes a stationarity discerning means for, based on flow rate time series data that are time series data of measured values of flow rate, discerning whether the state of fluctuation in the flow rate is a steady state or a non-steady state and a mixing ratio estimating means for, by using a discernment result from the stationarity discerning means, a mixing ratio fluctuation model that models probabilistic fluctuation in a mixing ratio that is a proportion of a steady state to a non-steady state both being included in the state of fluctuation in the flow rate, and a discernment result observation model that indicates a probability that a discernment result from the stationarity discerning means is one predetermined state with respect to any mixing ratio, estimating a mixing ratio included in the state of fluctuation in the flow rate at a specified time out of times corresponding to measured values included in the flow rate time series data.

A flow rate prediction method according to still another aspect of the present invention includes the steps of, based on flow rate time series data that are time series data of measured values of flow rate, discerning whether the state of fluctuation in the flow rate is a steady state or a non-steady state, by using the discernment result, a mixing ratio fluctuation model that models probabilistic fluctuation in a mixing ratio that is a proportion of a steady state to a non-steady state both being included in the state of fluctuation in the flow rate, and a discernment result observation model that indicates a probability that a discernment result of the stationarity is one predetermined state with respect to any mixing ratio, estimating a mixing ratio of a steady state to a non-steady state both being included in the state of fluctuation in the flow rate at a specified time out of times corresponding to measured values included in the flow rate time series data, and, based on the estimated mixing ratio, mixing a steady model that represents fluctuation in the flow rate in a steady state and a non-steady model that represents fluctuation in the flow rate in a non-steady state to construct a mixed model that serves as a fluctuation model of the flow rate.

A mixing ratio estimation method according to still another aspect of the present invention includes the steps of, based on flow rate time series data that are time series data of measured values of flow rate, discerning whether the state of fluctuation in the flow rate is a steady state or a non-steady state, and, by using the discernment result, a mixing ratio fluctuation model that models probabilistic fluctuation in a mixing ratio that is a proportion of a steady state to a non-steady state both being included in the state of fluctuation in the flow rate, and a discernment result observation model that indicates a probability that a discernment result of the stationarity is one predetermined state with respect to any mixing ratio, estimating a mixing ratio of a steady state to a non-steady state both being included in the state of fluctuation in the flow rate at a specified time out of times corresponding to measured values included in the flow rate time series data.

A computer-readable recording medium according to still another aspect of the present invention non-transitorily stores a flow rate prediction program that makes a computer execute a process of, based on flow rate time series data that are time series data of measured values of flow rate, discerning whether the state of fluctuation in the flow rate is a steady state or a non-steady state, a process of, by using the discernment result, a mixing ratio fluctuation model that models probabilistic fluctuation in a mixing ratio that is a proportion of a steady state to a non-steady state both being included in the state of fluctuation in the flow rate, and a discernment result observation model that indicates a probability that a discernment result of the stationarity is one predetermined state with respect to any mixing ratio, estimating a mixing ratio of a steady state to a non-steady state both being included in the state of fluctuation in the flow rate at a specified time out of times corresponding to measured values included in the flow rate time series data, and a process of, based on the estimated mixing ratio, mixing a steady model that represents fluctuation in the flow rate in a steady state and a non-steady model that represents fluctuation in the flow rate in a non-steady state to construct a mixed model that serves as a fluctuation model of the flow rate.

A mixing ratio estimation program according to the present invention makes a computer execute a process of, based on flow rate time series data that are time series data of measured values of flow rate, discerning whether the state of fluctuation in the flow rate is a steady state or a non-steady state, and a process of, by using the discernment result, a mixing ratio fluctuation model that models probabilistic fluctuation in a mixing ratio that is a proportion of a steady state to a non-steady state both being included in the state of fluctuation in the flow rate, and a discernment result observation model that indicates a probability that a discernment result of the stationarity is one predetermined state with respect to any mixing ratio, estimating a mixing ratio of a steady state to a non-steady state both being included in the state of fluctuation in the flow rate at a specified time out of times corresponding to measured values included in the flow rate time series data.

Advantageous Effects of Invention

According to the present invention, communication throughput or fluctuation therein may be predicted with higher accuracy. In addition, according to the present invention, a mixing ratio of a steady state to a non-steady state both being included in the state of fluctuation in communication throughput may also be estimated with higher accuracy.

BRIEF DESCRIPTION OF DRAWINGS

FIG. 8 is a flowchart illustrating an example of an operation of a particle filter application unit;

FIG. 9 is an explanatory diagram illustrating an example of an algorithm for generation and tracking of particles using a particle filter;

DESCRIPTION OF EMBODIMENTS

Hereinafter, example embodiments of the present invention will be described with reference to the accompanying drawings. The present invention is suitably applicable to prediction of not only a flow rate relating to communication but also any flow rate (for example, a traffic volume, a flow rate of fluid, a flow rate of gas, and the like). In the following example embodiment, a communication throughput prediction device that predicts communication throughput will be taken up for description as an example embodiment.

Figure 15:
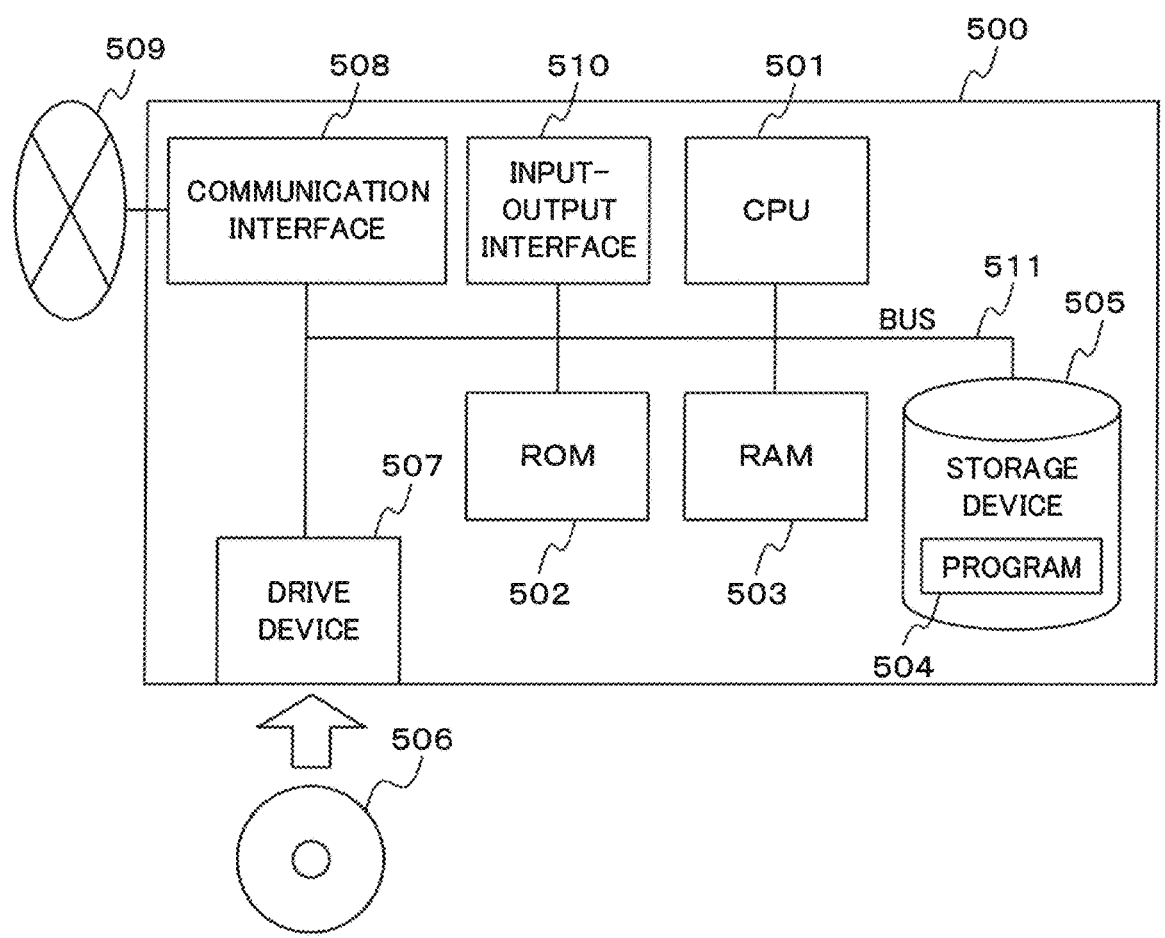
FIG. 15 is a diagram illustrating an example of an information processing device that achieves respective devices in the respective example embodiments of the present invention.

In the example embodiments of the present invention, each component in respective devices represents a block of a functional unit. Each component in the respective devices may be achieved by any combination of, for example, an information processing device 500 as illustrated in FIG. 15 and software. As an example, the information processing device 500 includes a configuration as described below.

CPU (Central Processing Unit) 501
ROM (Read Only Memory) 502
RAM (Random Access Memory) 503
A program 504 loaded into the RAM 503
A storage device 505 storing the program 504
A drive device 507 performing reading and writing from/to a storage medium 506
A communication interface 508 connecting to a communication network 509
An input-output interface 510 performing inputting and outputting of data
A bus 511 connecting the respective components Methods for achieving the respective devices include various variations. For example, each device may be achieved as a dedicated device. Each device may also be achieved by a combination of a plurality of devices.

Figure 1:
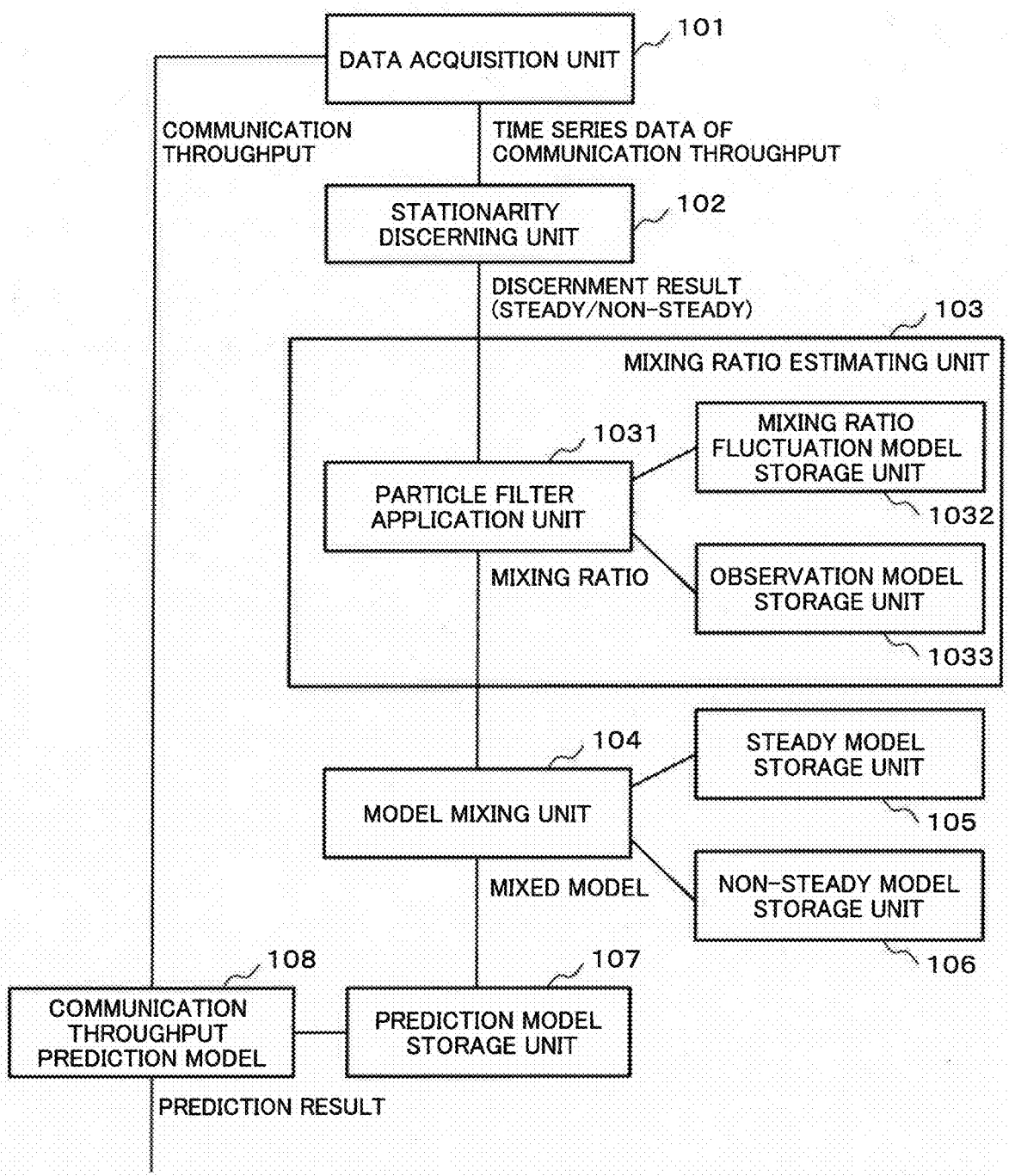
FIG. 1 is a block diagram illustrating a configuration example of a communication throughput prediction device.

FIG. 1 is a block diagram illustrating a configuration example of a communication throughput prediction device that is an example embodiment of the present invention. The communication throughput prediction device illustrated in FIG. 1 includes a data acquisition unit 101, a stationarity discerning unit 102, a mixing ratio estimating unit 103, a model mixing unit 104, a steady model storage unit 105, a non-steady model storage unit 106, a prediction model storage unit 107, and a communication throughput prediction unit 108.

The mixing ratio estimating unit 103 includes a particle filter application unit 1031, a mixing ratio fluctuation model storage unit 1032, and an observation model storage unit 1033.

First, each component will be described briefly. The data acquisition unit 101 acquires values (measured values) of communication throughput measured in a communication environment for which prediction is performed. In this case, the data acquisition unit 101 acquires the measured values as a portion of time series data. For example, the data acquisition unit 101 may acquire the measured values, which are measured successively, in conjunction with information on times at which the measured values were measured. The information on times is, however, not indispensable, and, measured values for at least a predetermined period may be retained arranged in the order of times at which the values were measured.

The data acquisition unit 101 may include, for example, a communication throughput measurement unit (not illustrated), make the communication throughput measurement unit measure a communication throughput value at a present time at every unit time, and acquire the measurement results in conjunction with time information indicating measurement times. Alternatively, the data acquisition unit 101 may be a means for reading, on an as-requested basis, a predetermined number of pairs of a measured value and time information that are measured by another device and retained in a predetermined storage device.

Using the time series data of the measured values of communication throughput, acquired by the data acquisition unit 101, the stationarity discerning unit 102 discerns the stationarity of at least a portion of the time series data. For example, the stationarity discerning unit 102 discerns the stationarity of communication throughput during a predetermined period defined using a specified time as a reference (final time) out of times corresponding to measured values included in the time series data, that is, discerns whether the state of fluctuation during the period is a steady state or a non-steady state, using a given time series analysis technique. The stationarity discerning unit 102 may discern the stationarity of communication throughput by, for example, performing a unit root test on at least a portion of the acquired time series data.

The mixing ratio estimating unit 103 estimates a mixing ratio, which is a proportion of a steady state to a non-steady state both being included in the state of fluctuation in the communication throughput, which is indicated by the time series data of measured values of communication throughput. As also described in NPL 1, the communication throughput changes from moment to moment. Thus, there is a possibility that the state of communication throughput, even if being determined to be in a steady state at a point of time, is brought to a non-steady state several seconds later. It is also conceivable that, even in the case of being determined to be in a non-steady state, the intensity of fluctuation varies on a moment-to-moment basis because various factors affect one another in a complicated manner. Therefore, it is assumed that, in the example embodiment of the present invention, the state of fluctuation in the communication throughput also takes a mixed state into which a steady state and a non-steady state are mixed at a mixing ratio. Further, as an index representing characteristics of fluctuation in a changing process of communication throughput, the mixing ratio, which is a proportion of a steady state to a non-steady state both being included in the state of fluctuation in the communication throughput during a predetermined period, is used.

In the present example embodiment, the mixing ratio estimating unit 103 estimates the mixing ratio using a time series filter, which achieves Bayesian inference using Monte Carlo simulation. Such a filter is, in general, referred to as a particle filter. The particle filter is also referred to as a Monte Carlo filter or a bootstrap filter.

The particle filter application unit 1031, using discernment results discerned by the stationarity discerning unit 102 as observed values, applies the particle filter to an obtained time series data of the observed values to obtain a probability model (probability distribution) in which the observed values in a conditional distribution are represented by approximation to a number of realized values. More specifically, to represent the observed values in a conditional distribution by approximation to a number of realized values, an equation expressing a posterior probability at any given time t in terms of a prior probability and a likelihood is formulated, and an object is tracked by sequentially calculating expected values of the posterior probability. The particle filter has characteristics of not only using predicted values obtained using a state model in tracking the object but also giving weights, which are given to likely realized values, by means of likelihood calculation using an observation model. The particle filter application unit 1031 may, for example, calculate an expected value of the posterior probability at time t corresponding to a latest observed value in accordance with the obtained probability distribution, and consider the calculated expected value as an estimation result of a mixing ratio.

On the basis of the mixing ratio estimated by the mixing ratio estimating unit 103, the model mixing unit 104 mixes a steady model and a non-steady model, which have been prepared in advance, to construct a mixed model that serves as a fluctuation model of communication throughput. As used herein, the steady model is a model representing fluctuation in the communication throughput in a steady state. The non-steady model is a model representing fluctuation in the communication throughput in a non-steady state.

The prediction model storage unit 107 stores information on a fluctuation model of communication throughput, which is used for prediction of communication throughput. In the present example embodiment, the prediction model storage unit 107 stores information on the fluctuation model (mixed model) of communication throughput that the model mixing unit 104 has constructed.

On the basis of the information on the fluctuation model of communication throughput stored in the prediction model storage unit 107, the communication throughput prediction unit 108 predicts communication throughput at a point of time in the future and fluctuation in the communication throughput from a present point of time to a point of time in the future.

Next, operations of the respective components until obtaining the fluctuation model of communication throughput will be described more specifically.

When it is assumed that the unit time is denoted by $\tau$, the size of data completely transmitted from time $t_0$, which is defined to be a start time, to time t, is denoted by $S_t$, and the size of data completely transmitted by the previous time $t-1$ are denoted by $S_{t-1}$, the communication throughput $x_t$ at the time t is defined by the equation (1) below.

[Math. 1]

$$x_t = \frac{S_t - S_{t-1}}{\tau} \tag{1}$$

If it is assumed that the unit time $\tau=1$, the equation (1) can be expressed as the equation (2) below.

$$x_t = S_t - S_{t-1} \tag{2}$$

By measuring communication throughput $x_t$ or collecting measured communication throughput $x_t$ at every unit time, for example, the data acquisition unit 101 is able to obtain a set of communication throughput $\{x_t\}$ (where t represents any given time) as time series data. For example, when it is assumed that time t=T is a latest time at which communication throughput is measured, the data acquisition unit 101 acquires $\{x_t\}=\{\ldots, x_{T-3}, x_{T-2}, x_{T-1}, x_T\}$ as time series data through the above measurement or collection. The number of pieces of data to be retained is not limited to a specific number.

The stationarity discerning unit 102 applies, for example, a unit root test to the time series data $\{x_t\}$ including at least a predetermined number of values of communication throughput $x_t$ to discern the stationarity of the time series data $\{x_t\}$.

The unit root test is a method for testing whether or not a stochastic process represented by time series data subject to the test is steady with respect to a stochastic process model that serves as a base. In the following description, as a stochastic process model, a unit root test employing a first order autoregressive model (AR(1) model) as expressed by the equation (3) below will be described; however, the stochastic process model is not limited to AR(1).

$$(1-\rho L)(x_t-\xi)=\varepsilon_t \tag{3}$$

In the equation (3), L is a lag operator which, when applied, causes the index of an data item to be shifted to the index of the previous data item, as in $Lx_t=x_{t-1}$. In addition, $\varepsilon_t$ is an error term following $N(0, \sigma_\varepsilon^2)$. Furthermore, $\xi$ is a constant term, and $\rho$ is a coefficient.

The stationarity of the stochastic process model expressed by the equation (3) varies depending on the value of $\rho$, and becomes a steady state when $-1<\rho<1$ holds, and, otherwise, a non-steady state. However, when $|\rho|>1$ holds, although the stochastic process becomes a process that diverges to infinity, the case in which $|\rho|>1$ holds does not have to be considered because there is no case in which communication throughput diverges to infinity. Further, when $-1<\rho\leq 0$ holds, since the signs reverse, the case in which $-1<\rho\leq 0$ holds is also not considered. Therefore, in discerning stationarity, whether ρ=1 (non-steady) or ρ<1 (steady) holds may be considered.

When it is assumed that a stochastic process model in the cases of being in a non-steady state is denoted as a non-steady model $M_n$, and a stochastic process model in the cases of being in a steady state is denoted as a steady model $M_s$, the models can be expressed by the equation (3-1) and equation (3-2) below, respectively. In the equations, a and b are defined as a=ξ(1−ρ) and b=ρ−1, respectively.

$$M_n: x_t = x_{t-1} + \varepsilon_t \tag{3-1}$$

$$M_s: x_t = a + b x_{t-1} + \varepsilon_t \tag{3-2}$$

Figure 2:
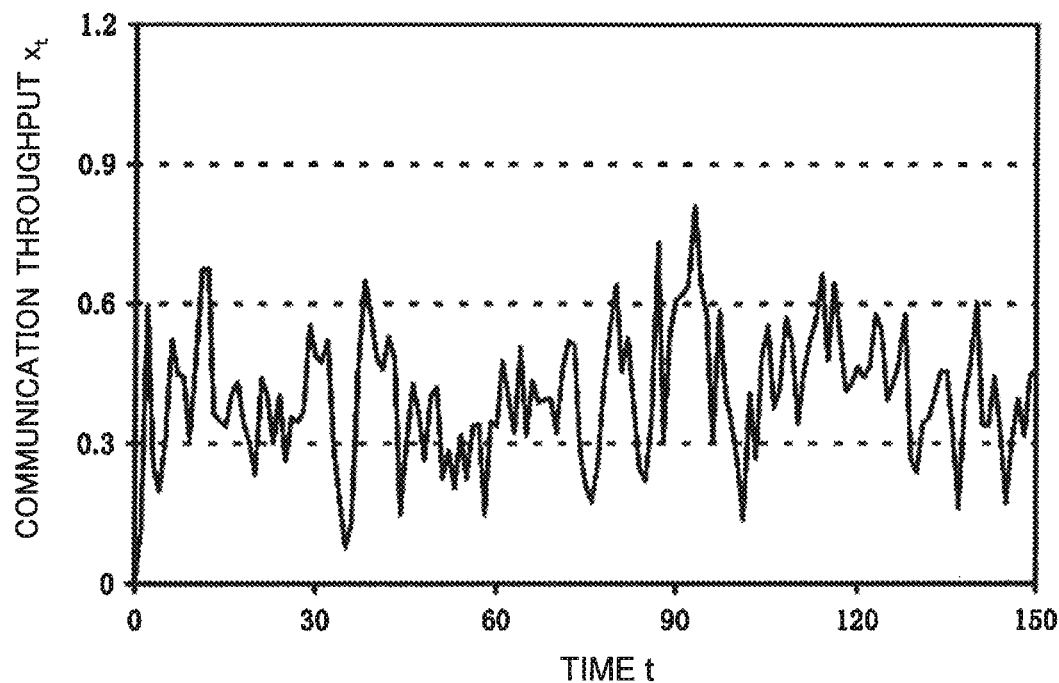
FIG. 2 is a graph illustrating an example of a sample path of a steady process that a steady model expresses.

FIG. 2 is a graph illustrating an example of a sample path of the steady process that is represented by the steady model $M_s$. In FIG. 2, an example of a sample path of the equation (3) when ρ<1 holds, that is, the stochastic process model (equation (3-2)) in the case of being in a steady state, is illustrated. Referring to FIG. 2 reveals a situation that the communication throughput in the case of being in a steady state fluctuates around a constant value in a stable manner, while fluctuating as the time elapses.

Figure 3:
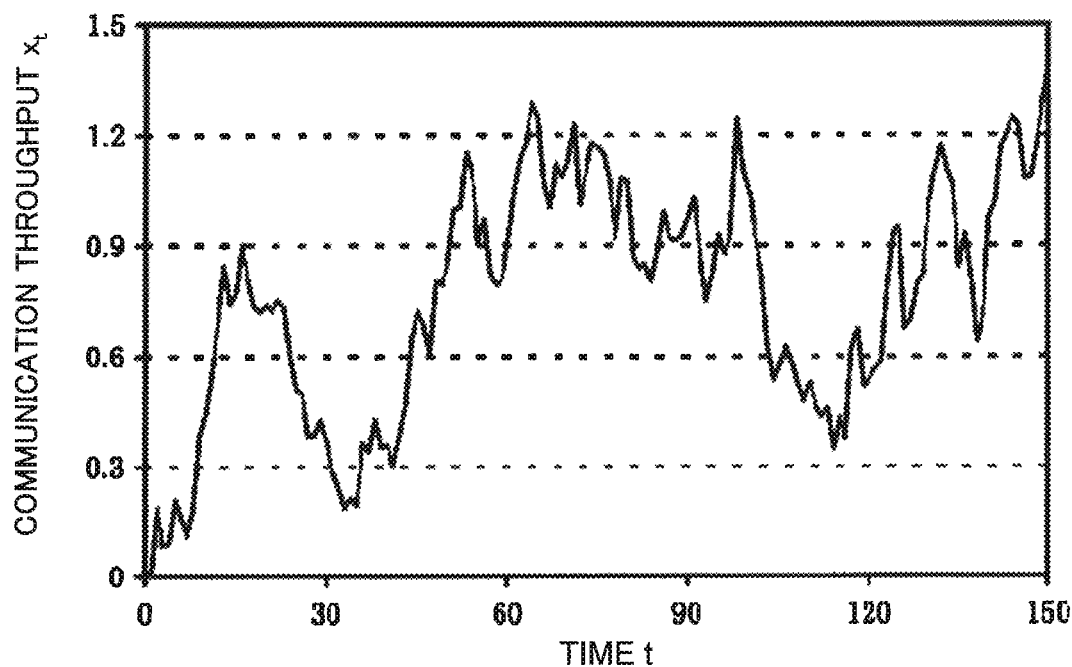
FIG. 3 is a graph illustrating an example of a sample path of a non-steady process that a non-steady model expresses.

FIG. 3 is a graph illustrating an example of a sample path of the non-steady process that is represented by the non-steady model $M_n$. In FIG. 3, an example of a sample path of the equation (3) when ρ=1 holds, that is, the stochastic process model (equation (3-1)) in the case of being in a non-steady state, is illustrated. Referring to FIG. 3 reveals a situation that the communication throughput in the case of being in a non-steady state fluctuates violently in an unstable manner as a whole, while an amount of fluctuation therein per unit time being at approximately the same level as that in FIG. 2.

In the unit root test, statistical hypothesis testing assuming ρ=1 and ρ<1 as the null hypothesis and the alternative hypothesis, respectively, is performed. More specifically, on the basis of a distribution (null distribution) of estimated values of ρ when the null hypothesis is true, a predetermined significance level (10%, 5%, or the like), and estimated values of ρ that are estimated from the actually measured time series data $\{x_t\}$, whether or not the null hypothesis can be rejected is determined.

The stationarity discerning unit 102 may, for example, perform a unit root test on time series data defined using a specified time as a reference (final time) out of times t corresponding to measured values included in the time series data of communication throughput collected by the data acquisition unit 101. When the null hypothesis can be rejected, that is, a hypothesis of being in a steady state is accepted, the stationarity discerning unit 102 may output "0" as a discernment result at the time, and, when the null hypothesis cannot be rejected, that is, a hypothesis of being in a non-steady state is accepted, output "1" as a discernment result at the time.

For example, when time t=T is specified for time series data of communication throughput $\{ \ldots, x_{T-1}, x_T, x_{T+1}, \ldots \}$, the stationarity discerning unit 102 may discern, as a stationarity discernment result at the time t=T, the stationarity of the state of fluctuation indicated by time series data $\{x_{T-49}, \ldots, x_{T-1}, x_T\}$ of communication throughput at 50 points of time in the past including the time t=T. For example, when time t=T+25 is specified subsequently, the stationarity discerning unit 102 may discern, as a stationarity discernment result at the time t=T+25, the stationarity of the state of fluctuation indicated by time series data $\{x_{T-24}, \ldots, x_{T+25}\}$ of communication throughput at 50 points of time in the past including the time t=T+25.

Figure 4:
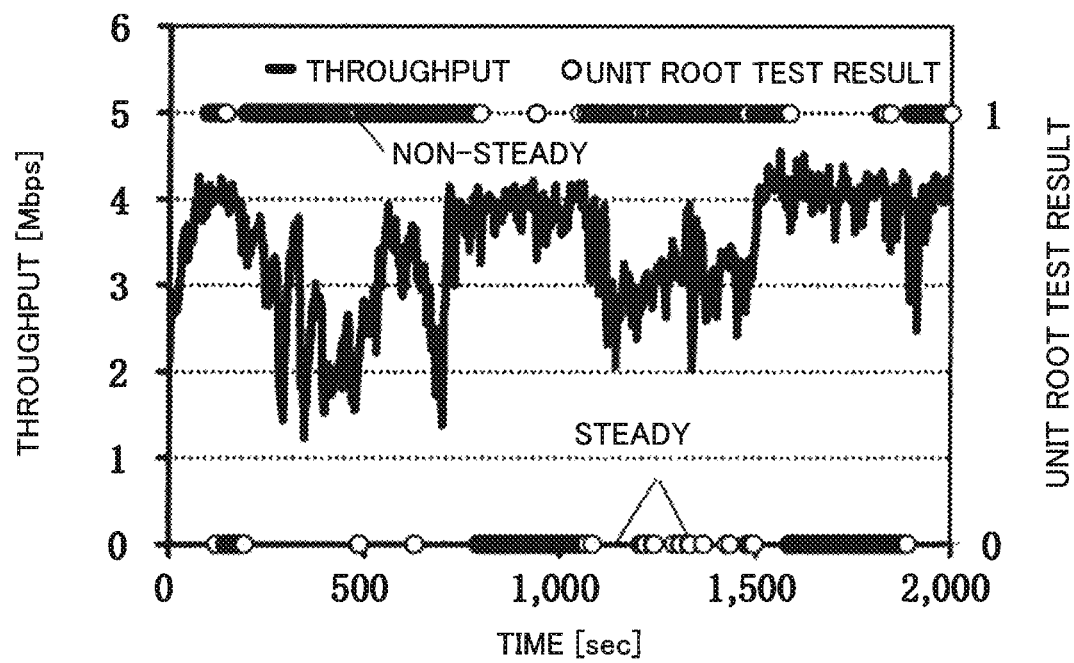
FIG. 4 is an explanatory diagram illustrating an example of stationarity discernment results of time series data of communication throughput.

FIG. 4 is an explanatory diagram illustrating an example of stationarity discernment results for time series data of communication throughput. In FIG. 4, in conjunction with time series data of communication throughput, which are subject to discernment, results of unit root tests on the time series data performed for every 50 measurement points of communication throughput are illustrated. The first vertical axis (left axis) represents the communication throughput $x_t$ [Mbps], the horizontal axis represents the time t [sec], and the second ordinate (right axis) represents the result of the unit root test (0: steady/1: non-steady). Referring to FIG. 4 reveals that, when fluctuation in the communication throughput $x_t$ is relatively stable, a unit root test result "0" (steady) is plotted, and, when unstable, "1" is plotted.

However, as described in the above-described NPL 1, in many cases, the actual state of fluctuation in the communication throughput is not in either a steady state or non-steady state, but is in a mixed state into which the two states are mixed.

The mixing ratio estimating unit 103 estimates a mixing ratio of a steady state to a non-steady state both being included in the state of fluctuation in the communication throughput during a predetermined period defined using a specified time as a reference (final time), using results from the discernment performed by the stationarity discerning unit 102, a mixing ratio fluctuation model stored in the mixing ratio fluctuation model storage unit 1032, and a discernment result observation model stored in the observation model storage unit 1033.

More specifically, the particle filter application unit 1031 applies the particle filter that uses the mixing ratio fluctuation model stored in the mixing ratio fluctuation model storage unit 1032 and the discernment result observation model stored in the observation model storage unit 1033 to the results from the discernment performed by the stationarity discerning unit 102 to estimate the mixing ratio.

The mixing ratio fluctuation model storage unit 1032 stores information on the mixing ratio fluctuation model that has been defined in advance. The mixing ratio fluctuation model may, for example, be defined in the following manner.

That is, it may be assumed that, when a mixing ratio $r_{t-1}$ at time t−1 is obtained, a mixing ratio $r_t$ at time t fluctuates in accordance with a probability distribution represented by the equation (4) below.

[Math. 2]

$$p(r_t \mid r_{t-1}) = \frac{\frac{1}{\sigma} \phi\left(\frac{r_t - r_{t-1}}{\sigma}\right)}{\Phi\left(\frac{1 - r_{t-1}}{\sigma}\right) - \Phi\left(\frac{-r_{t-1}}{\sigma}\right)} \tag{4}$$

Figure 5:
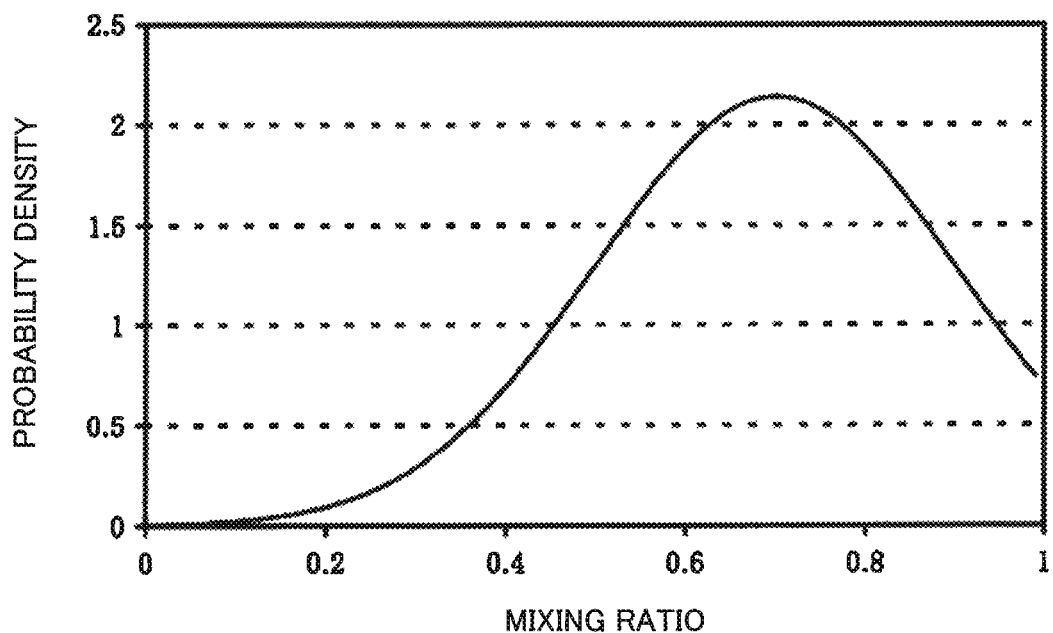
FIG. 5 is a graph illustrating an example of a truncated normal distribution that is used for a fluctuation model of a mixing ratio.

In the equation (4), ϕ( ) and Φ( ) are the probability density function (PDF) and the cumulative distribution function (CDF), respectively, of a standard normal distribution N(0, 1). The probability distribution expressed by the equation (4) is referred to as a truncated normal distribution and has a distribution that is obtained by truncating a normal distribution $N(r_{t-1}, \sigma)$ to [0, 1], which is the domain of the mixing ratio. That is, the above assumption is equivalent to assuming that the mixing ratio fluctuates at random with a variance $\sigma^2$ within [0, 1]. In the equation (4), σ is a hyperparameter that represents the magnitude of fluctuation in the mixing ratio. FIG. 5 is a graph illustrating an example of the truncated normal distribution used in the mixing ratio fluctuation model. In FIG. 5, a probability distribution $p(r_t|r_{t-1})$ when $r_{t-1}$ and $\sigma$ are set as $r_{t-1}$=0.7 and $\sigma$=0.2, respectively, in the equation (4) is illustrated. The mixing ratio fluctuation model storage unit 1032 may store, as information on the mixing ratio fluctuation model, parameters for identifying a probability density function having such a probability distribution, the address of a module into which processing that returns a probability density corresponding to a value ($r_t$) in a succeeding round using a value ($r_{t-1}$) in a preceding round as an argument has been implemented, and the like.

In addition to the model expressed by the above-described equation (4), any mixing ratio fluctuation model can be employed as long as being a stochastic process satisfying the following two conditions: (condition 1) the codomain thereof being the domain of the mixing ratio; and (condition 2) being a Markov process.

With regard to (condition 1), the model may be a stochastic process the codomain of which is [0, 1] ($r_t \in$ [0, 1]), in the case of the example. With regard to (condition 2), "being a Markov process" specifically means that a future value (probability distribution thereof) may depend on only a present value (the previous value), in other words, not depend on a fluctuation history in the past. That is, the model may satisfy $p(r_t|r_{t-1}, r_{t-2}, r_{t-3}, \ldots) = p(r_t|r_{t-1})$.

Examples of such a stochastic process include, for example, stochastic processes represented by probability distributions as described in the equations (4A) to (4C) below.

$$p(r_t|r_{t-1}) = p(r_t) = U(0,1) \quad (4A)$$

$$p(r_t|r_{t-1}) = U(a,b) \quad (4B)$$

where a=max($r_{t-1}-\sigma$, 0) and b=min($r_{t-1}+\sigma$, 1).

[Math. 3]

$$p(r_t | r_{t-1}) = A(r_{t-1})\cos\left\{(r_t - r_{t-1})\frac{\pi}{2}\right\} \quad (4C)$$

where $$A(r_{t-1}) = \frac{\frac{\pi}{2}}{\sin\left\{(1 - r_{t-1})\frac{\pi}{2}\right\} - \sin\left\{(-r_{t-1})\frac{\pi}{2}\right\}}$$

Figure 6A:
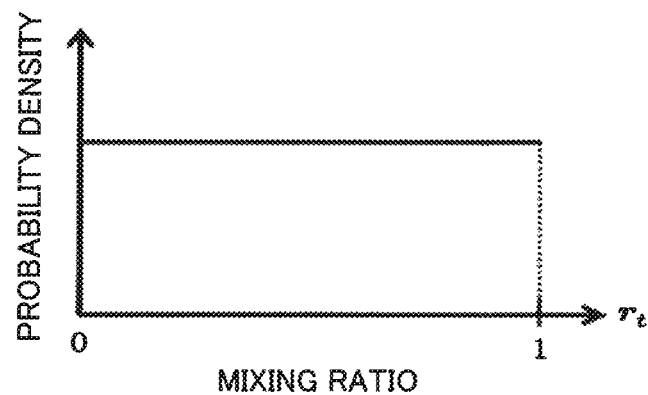
FIG. 6A is a graph illustrating another example of a probability distribution that is used for the fluctuation model of the mixing ratio.
Figure 6B:
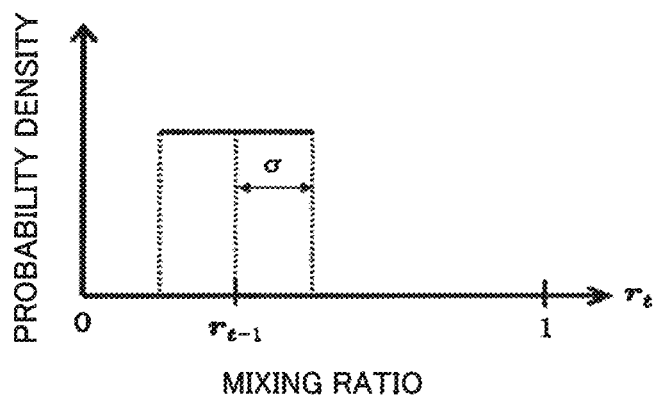
FIG. 6B is a graph illustrating still another example of the probability distribution that is used for the fluctuation model of the mixing ratio.
Figure 6C:
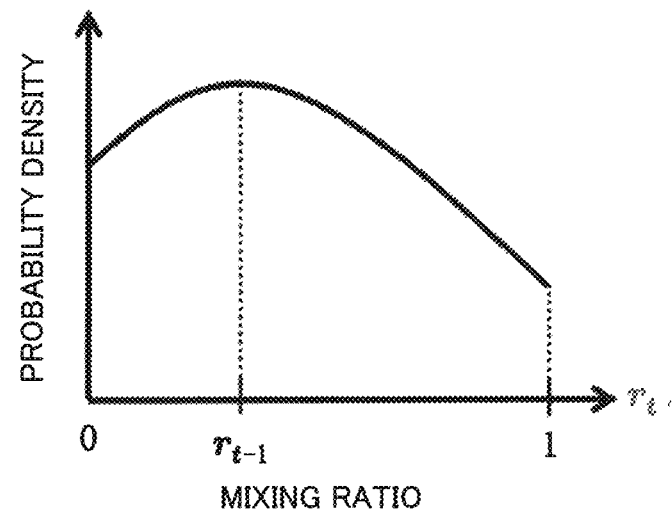
FIG. 6C is a graph illustrating still another example of the probability distribution that is used for the fluctuation model of the mixing ratio.

The equation (4A) expresses a uniform distribution. In this case, a random variable $r_t$ takes a random value within [0, 1]. The equation (4B) represents a uniform distribution under which values are distributed within a range of $\pm\sigma$ around a preceding-round value ($r_{t-1}$) (however, truncated to a range of [0, 1]). The max( ) is a function that returns the maximum value out of the values inside ( )(arguments). The min( ) is a function that returns the minimum value out of the values inside ( ) (arguments). The example of the equation (4C) is a model formulated using trigonometric functions. The coefficient A in the equation (4C) is a coefficient for making an integrated value of the density function coincide with 1. FIGS. 6A to 6C are schematic views of the probability distributions $p(r_t|r_{t-1})$ represented by the above-described equations (4A) to (4C).

The observation model storage unit 1033 stores information on the discernment result observation model, which has been defined in advance. The discernment result observation model can be represented, as in the equation (5) below, for example, a probability distribution of the stationarity discernment result $u_t$ (steady/non-steady) of communication throughput under the condition that the mixing ratio is $r_t$.

$$p(u_t|r_t) = (1-f(r_t))\delta(u_t) + f(r_t)\delta(u_t-1) \quad (5)$$

In the equation (5), $\delta(\ )$ denotes a Dirac delta function. In addition, $f(r_t)$ denotes a probability that, when the mixing ratio in the actual state of fluctuation in the communication throughput during a predetermined period defined using time t as a reference is $r_t$, the stationarity discernment result $u_t$ becomes 1 (being in a non-steady state is accepted). Since it is difficult to obtain $f(r_t)$ analytically, $f(r_t)$ is, for example, obtained using simulation and the like in advance.

Figure 7:
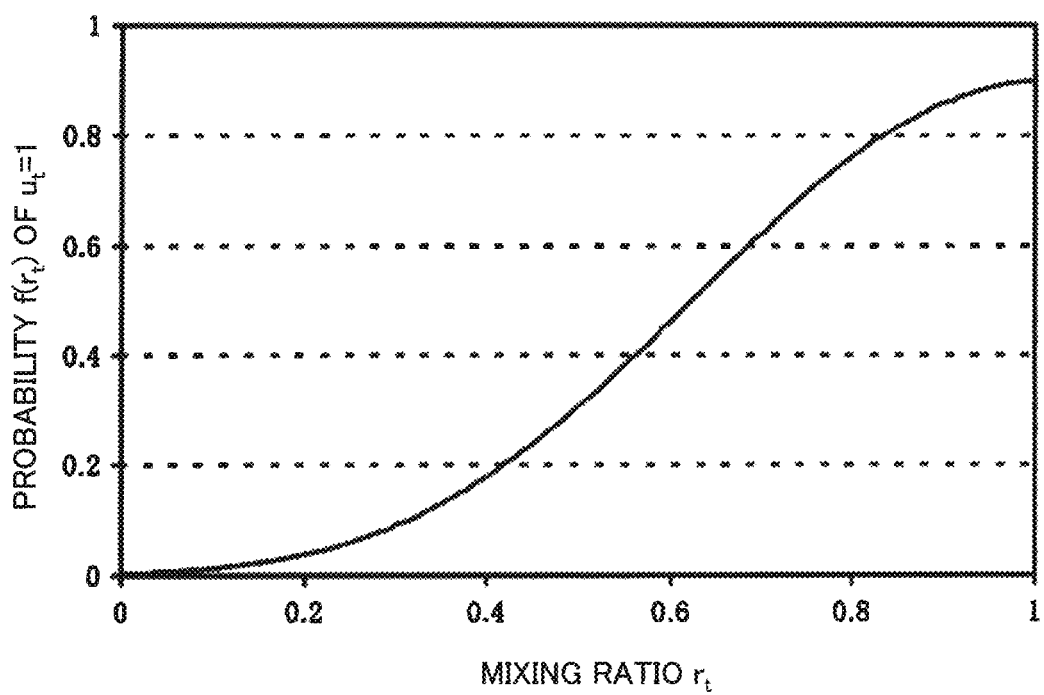
FIG. 7 is a graph illustrating an example of a probability $f(r_t)$ that a unit root test results in "1" ("non-steady" is accepted) for a given mixing ratio.

FIG. 7 is a graph illustrating an example of $f(r_t)$. In FIG. 7, values of $f(r_t)$ for any mixing ratios $r_t$ are illustrated when the parameters in the steady model $M_s$ and the non-steady model $M_n$ described above are defined as $\sigma\varepsilon$=0.3, a=$\xi$(1-$\rho$)=0.2, and b=$\rho$-1=-0.5, and a significance level in the unit root test used for stationarity discernment is set at 10%.

The values of $f(r_t)$ illustrated in FIG. 7 are obtained by generating sample paths repeatedly using mixed models into which the steady model $M_s$ and non-steady model $M_n$ having the above-described parameters are mixed at mixing ratios $r_t$ and performing stationarity discernment (unit root test) on time series data of communication throughput represented by the sample paths. Although it is required to obtain all $f(r_t)$ in a three-dimensional space ($\sigma$, a, b) in advance in the strict sense, approximate values may be obtained through interpolation based on a finite number of $f(r_t)$ practically.

Once a state space model, that is, a pair of the above-described fluctuation model and observation model, is formulated, the mixing ratio, which is a state variable, can be estimated from stationarity discernment results, which are observed data. In the particle filter, by tracking how random values, referred to as particles, transition in the state space model, a conditional probability distribution of a state variable (the mixing ratio in this case) for given observed data (stationarity discernment results in this case) is computed.

FIG. 8 is a flowchart illustrating an operation example of the particle filter application unit 1031. FIG. 9 is an explanatory diagram illustrating an example of an algorithm for generating and tracking particles in the particle filter. First, the particle filter application unit 1031 generates initial particles (in the example, particles at time t=0) (step S11 in FIG. 8 and lines 1 to 3 in FIG. 9). In FIG. 9, N is the number of particles to be generated. In addition, U(0, 1) is a uniform distribution on an interval [0, 1]. In this case, as values of the initial particles, real numbers not less than 0 and not greater than 1 are set at random.

Subsequently, the particle filter application unit 1031 successively tracks how the generated particles transition in accordance with the state space model (steps S12 to S15 in FIG. 8 and lines 4 to 11 in FIG. 9). In this case, t=1, 2, 3, . . . in line 4 in FIG. 9 indicates an index of time corresponding to time series data $\{u_t\}$ of discernment results.

In the tracking of particles, the particle filter application unit 1031 first calculates to which values particles having been generated at a previous time (time t-1) change at time t using the fluctuation model, in order from a tracking start time (assuming t=1) (step S13 in FIG. 8 and line 6 in FIG. 9). Subsequently, the particle filter application unit 1031 calculates likelihoods of the particles after fluctuation under the condition that observed data have been acquired (step S14 in FIG. 8 and line 7 in FIG. 9). Subsequently, the particle filter application unit 1031 resamples the particles using the calculated likelihoods as weights to generate new particles (step S15 in FIG. 8 and line 10 in FIG. 9). For example, the particle filter application unit 1031 resamples the particles by allowing overlap of the particles one another at ratios proportional to the calculated likelihoods to generate the new particles. The particle filter application unit 1031 repeats the above-described processing until, for example, t=T is reached. It is possible to approximate the distribution of the particles obtained as described above by the distribution of the state variable (mixing ratio).

For example, it is possible to approximate the conditional probability distribution $p(r_t|u_1, \ldots, u_t)$ of the mixing ratio $r_t$ at the time t=T when stationarity discernment results at times t=1 to T are $\{u_1, \ldots, u_T\}$ by the equation (6) below.

[Math. 4]

$$p(r_t | u_1, \ldots, u_t) = \frac{p(u_t|r_t)p(r_t|u_1, \ldots, u_{t-1})}{\int_0^1 p(u_t|r_t)p(r_t|u_1, \ldots, u_{t-1})dr_1} \quad (6)$$

$$\cong \frac{1}{N}\sum_{i=1}^{N} \delta(r_r - r_{t|t}^{(i)})$$

In this case, if an expected value of the probability distribution $p(r_t|u_1, \ldots, u_t)$ is employed as an estimated value of the mixing ratio $r_t$, the estimated value is calculated by the equation (7) below. The circumflex placed over $r_t$ indicates that the value is an estimated value.

[Math. 5]

$$\hat{r}_t = E[p(r_t | u_1, \ldots, u_t)] = \frac{1}{N}\sum_{i=1}^{N} r_{t|t}^{(i)} \quad (7)$$

Figure 10:
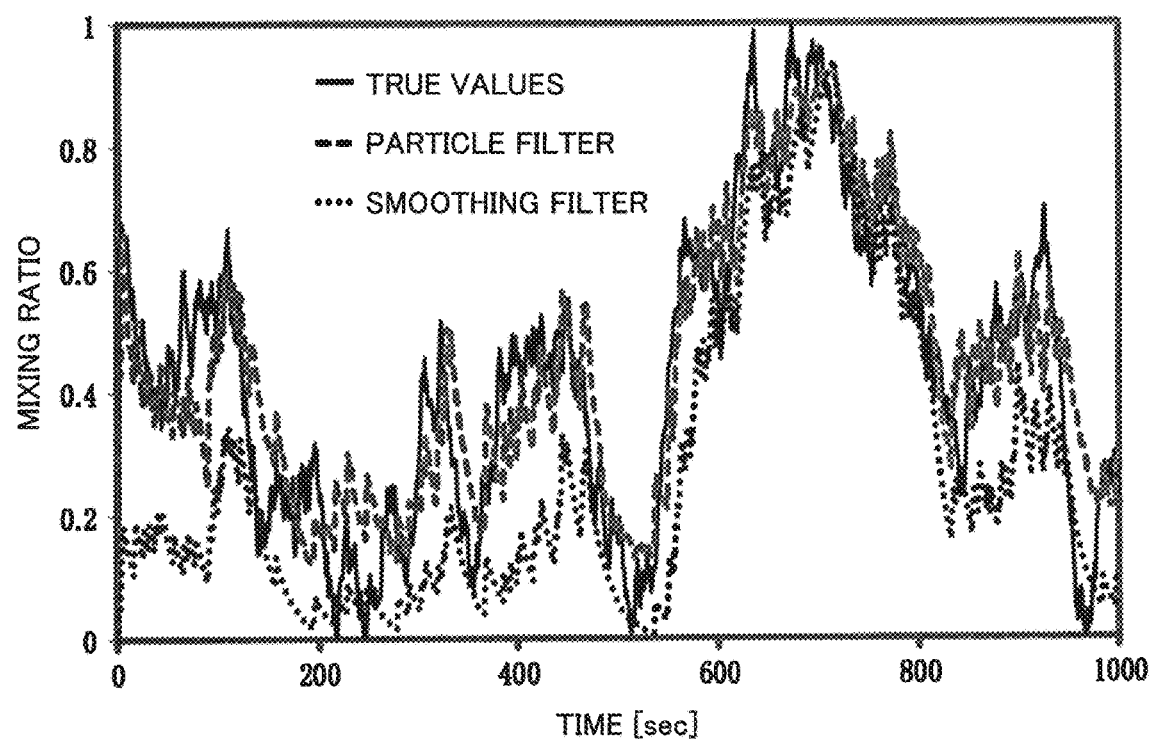
FIG. 10 is a graph illustrating an example of estimation results of the mixing ratio.
Figure 11:
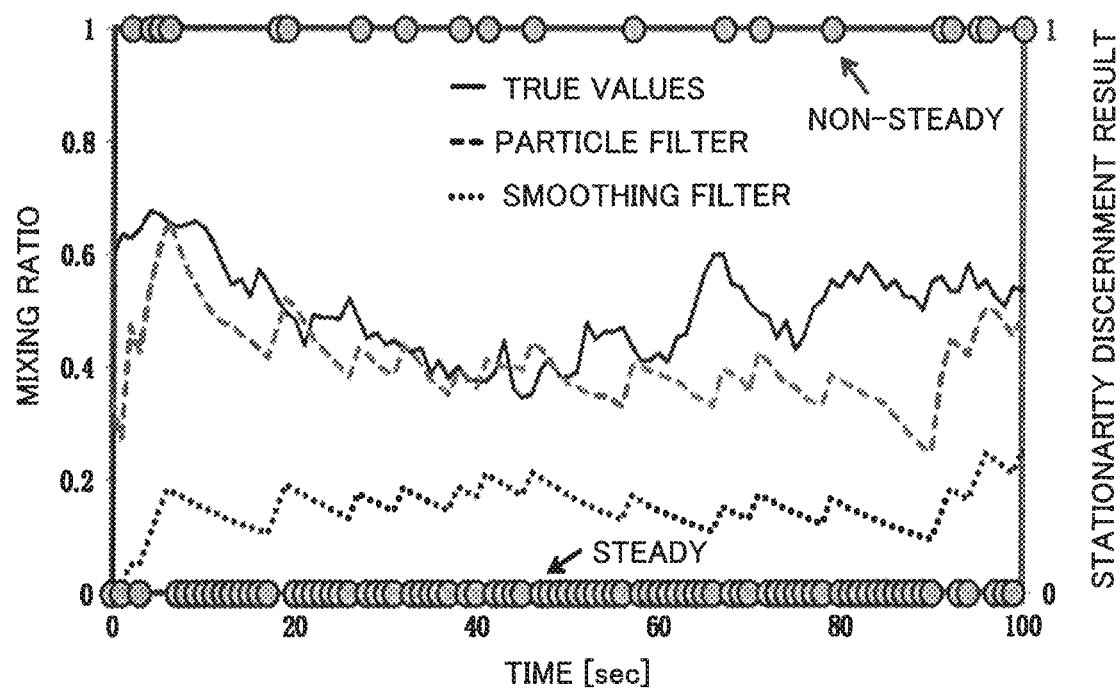
FIG. 11 is a graph illustrating an example of estimation results of the mixing ratio.

FIG. 10 is a graph illustrating an example of the estimation results of the mixing ratio. In FIG. 10, a simulation result of the mixing ratio estimated by the method described above is illustrated. In FIG. 10, a simulation result of the mixing ratio estimated using a smoothing filter and true values of the mixing ratio are also illustrated as comparison objects. In FIG. 11, a portion of FIG. 10 corresponding to the first 100 [sec] is also illustrated in conjunction with stationarity discernment results that are used in the estimation. Referring to FIGS. 10 and 11, it is possible to confirm that mixing ratios estimated by the mixing ratio estimating unit 103 are closer to the true values.

On the basis of the mixing ratio $r_t$ estimated by the mixing ratio estimating unit 103, the model mixing unit 104 constructs a mixed model into which the steady model and the non-steady model are mixed. For example, when it is assumed that the probability distributions of the steady model at time advanced into the future by s from time t=T corresponding to a present time is denoted by $g_s(x_{t=T+s})$ and the non-steady model at time advanced into the future by s from time t=T corresponding to the present time is denoted by $g_n(x_{t=T+s})$, the probability distribution $g_{mix}(x_{t=T+s})$ of a mixed model mixed at a mixing ratio $r_t=T$ at the time t=T corresponding to the present time is represented by the equation (8) below.

$$g_{mix}(x_{t=T+s}) = (1-r_T)g_s(x_{t=T+s}) + r_T g_n(x_{t=T+s}) \quad (8)$$

The mixed model that provides the probability distribution $g_{mix}(x_t)$ described above may be used as a fluctuation model of communication throughput.

The prediction model storage unit 107 may store a mixing ratio $r_T$ at a latest time obtained on the basis of the time series data of communication throughput, a parameter for identifying a probability density function representing the probability distribution $g_s(x_t)$ of the steady model, and a parameter for identifying a probability density function representing the probability distribution $g_n(x_t)$ of the non-steady model, as information representing the fluctuation model of communication throughput, for example.

The communication throughput prediction device may be a computer that includes a CPU and a storage medium storing programs and that operates under the control of the CPU based on the programs. In such a case, the data acquisition unit 101, the stationarity discerning unit 102, the mixing ratio estimating unit 103 (the particle filter application unit 1031), the model mixing unit 104, and the communication throughput prediction unit 108 are achieved by the CPU that operates in accordance with the programs. The mixing ratio fluctuation model storage unit 1032, the observation model storage unit 1033, the steady model storage unit 105, the non-steady model storage unit 106, and the prediction model storage unit 107 are achieved by the storage medium included in the computer.

Figure 12:
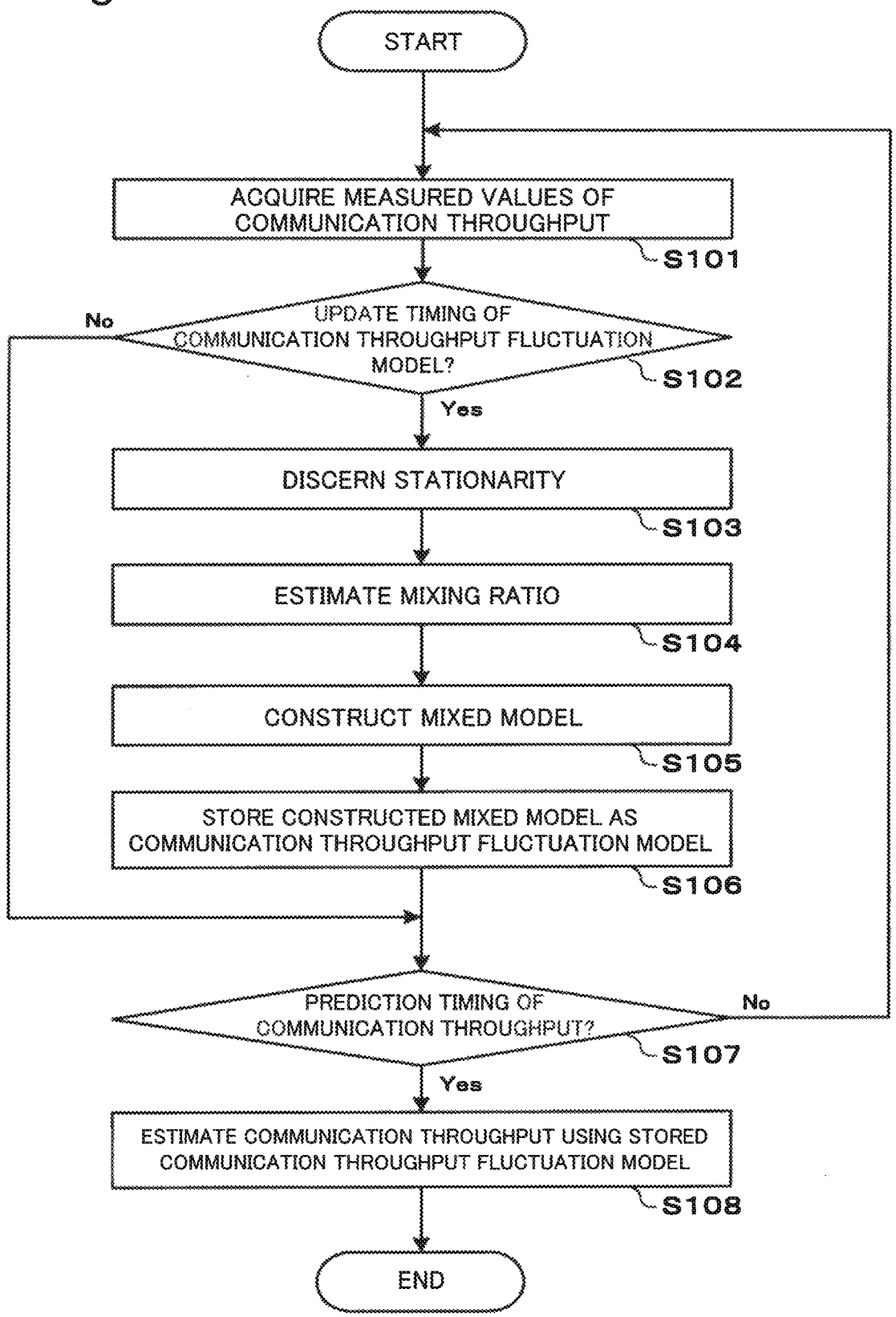
FIG. 12 is a flowchart illustrating an example of an operation of the communication throughput prediction device.

Next, an overall operation of the present example embodiment will be described. FIG. 12 is a flowchart illustrating an example of an operation of the communication throughput prediction device of the present example embodiment. In the example operation illustrated in FIG. 12, the data acquisition unit 101 first acquires measured values of communication throughput as time series data (step S101).

When a new measured value is acquired, a control unit (not illustrated) of the communication throughput prediction device determines whether it is update timing of the fluctuation model of communication throughput, and, if it is update timing, proceeds to step S103 (Yes in step S102). For example, the control unit may determine whether it is update timing of the fluctuation model of communication throughput on the basis of whether a predetermined period has elapsed since a last update, whether the update of the fluctuation model of communication throughput is instructed from outside of the device, and the like, for example. When it has reached the update timing of the fluctuation model of communication throughput, it is assumed that measured values providing at least stationarity discernment results sufficient for the number of repeats of particle tracking have been already collected.

On the other hand, if it is not the update timing, the process proceeds to step S107 (No in step S102).

In step S103, using a predetermined number of pieces of time series data including a measured value of communication throughput at a specified time (for example, time T corresponding to a present time), the stationarity discerning unit 102 discerns the stationarity of communication throughput at the specified time, and outputs a discernment result (for example, $u_{t=T}=0$ or 1). It is assumed that, in step S103, stationarity discernment results of the predetermined number are retained. In step S103, a plurality of times including the time T corresponding to a present time may be specified. In such a case, the stationarity of communication throughput defined using the respective specified times as references may be individually discerned, and results from the discernment may be output as time series data $\{\ldots, u_{T-1}, u_T\}$ of discernment result.

Subsequently, using the time series data $\{\ldots, u_{T-1}, u_T\}$ of discernment result regarding stationarity obtained by the stationarity discerning unit 102, the mixing ratio fluctuation model stored in the mixing ratio fluctuation model storage unit 1032, and the discernment result observation model stored in the observation model storage unit 1033, the particle filter application unit 1031 of the mixing ratio estimating unit 103 estimates a mixing ratio $r_T$ of a steady state to a non-steady state in the state of fluctuation in the communication throughput at the time t=T (step S104).

Subsequently, on the basis of the mixing ratio $r_T$ estimated by the mixing ratio estimating unit 103, the model mixing unit 104 mixes the steady model and the non-steady model to construct a mixed model that serves as a fluctuation model of communication throughput (step S105).

The model mixing unit 104 stores information on the constructed mixed model into the prediction model storage unit 107 (step S106).

Subsequently, the control unit (not illustrated) determines whether it is prediction timing of communication throughput, and, if it is prediction timing, proceeds to step S108 (Yes in step S107).

On the other hand, if it is not the prediction timing, the process returns to step S101 (No in step S107).

In step S108, the communication throughput prediction unit 108 predicts fluctuation in the communication throughput up to the point of time. On the basis of the fluctuation model (mixed model) of communication throughput indicated by the information stored in the prediction model storage unit 107, the communication throughput prediction unit 108 predicts a value of communication throughput at a point of time in the future or values of communication throughput at respective times up to the point of time. By performing such prediction, the communication throughput prediction unit 108 predicts fluctuation in the communication throughput up to the point of time. The communication throughput prediction unit 108 may, for example, estimate a value of communication throughput at a point of time in the future, using the mixed model as a fluctuation model of communication throughput, which the model mixing unit 104 has constructed. Alternatively, for example, the communication throughput prediction unit 108, may calculate stochastic expansion (stochastic diffusion) of communication throughput at any given times until a point of time in the future and use the calculated stochastic expansion as predicted values of fluctuation in the communication throughput up to the point of time in the future, using the fluctuation model of communication throughput.

As described thus far, the example embodiment may estimate the mixing ratio with high accuracy. Thus, using the estimated mixing ratio enables a fluctuation model of communication throughput with a higher prediction accuracy to be obtained. Therefore, it becomes possible to predict the communication throughput with high accuracy and to predict the state of fluctuation in communication throughput up to a point of time in the future.

The above-described configuration and specific processing in the respective components are only an example, and the present example embodiment is not limited to the above description. For example, the data acquisition unit, the stationarity discerning unit, the mixing ratio estimating unit, the model mixing unit, and the communication throughput prediction unit described in the above-described example embodiment, may be individually achieved as separate units. Similarly, the mixing ratio fluctuation model storage unit, the observation model storage unit, the steady model storage unit, the non-steady model storage unit, and the prediction model storage unit may be individually achieved as separate units.

Figure 13:
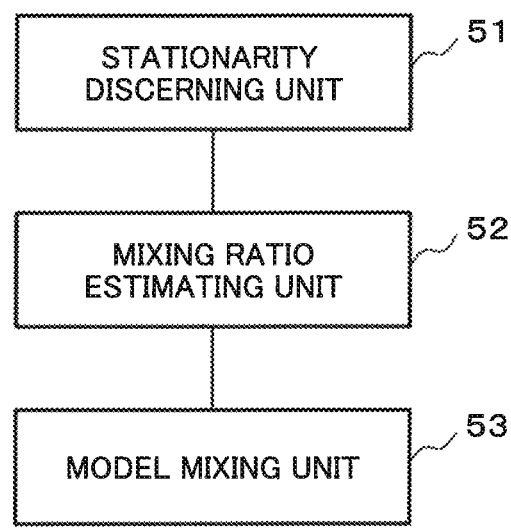
FIG. 13 is a block diagram illustrating an example embodiment that serves as an outline of the present invention.

Next, an example embodiment that serves as an overview of the present invention will be described. FIG. 13 is a block diagram illustrating an overview of a communication throughput prediction device according to the present example embodiment. As illustrated in FIG. 13, the communication throughput prediction device according to the present invention includes a stationarity discerning unit 51, a mixing ratio estimating unit 52, and a model mixing unit 53.

The stationarity discerning unit 51 (for example, the stationarity discerning unit 102) discerns whether the state of fluctuation in the flow rate is a steady state or a non-steady state based on flow rate time series data, which are time series data of measured values of flow rate.

The mixing ratio estimating unit 52 (for example, the mixing ratio estimating unit 103) estimates a mixing ratio of the steady state to the non-steady state both being included in the state of fluctuation in the flow rate at a specified time out of times corresponding to measured values included in the flow rate time series data. The mixing ratio estimating unit 52 (for example, the mixing ratio estimating unit 103) uses the following items upon estimation:

discernment results by the stationarity discerning unit 51;
a mixing ratio fluctuation model that models probabilistic fluctuation in the mixing ratio, which is a proportion of a steady state to a non-steady state both being included in the state of fluctuation in the flow rate; and
a discernment result observation model that indicates a probability that a discernment result by the stationarity discerning unit 51 is one predetermined state with respect to any mixing ratio.

The model mixing unit 53 (for example, the model mixing unit 104) mixes a steady model which represents fluctuation in the flow rate in the steady state and a non-steady model which represents fluctuation in the flow rate in a non-steady state, based on the mixing ratio estimated by the mixing ratio estimating unit 52. The model mixing unit 53 constructs a mixed model that serves as a fluctuation model of the flow rate.

Since being provided with such a characteristic feature, the communication throughput prediction device may estimate the mixing ratio included in the state of fluctuation in the communication throughput with high accuracy even for a communication environment and a time domain that have a possibility of being put in a mixed state, which enables the communication throughput or fluctuation therein to be predicted with higher accuracy.

In the above-described configuration, the stationarity discerning unit 51 may discern whether the state of fluctuation in the flow rate during a predetermined period defined using a specified time as a reference out of times corresponding to measured values included in the flow rate time series data is the steady state or the non-steady state. The mixing ratio estimating unit 52 may estimate the mixing ratio included in the state of fluctuation in the flow rate at a specified time. In this case, the mixing ratio estimating unit 52 uses the mixing ratio fluctuation model and the discernment result observation model that have been prepared in advance. The mixing ratio estimating unit 52 applies a particle filter, which achieves Bayesian inference using Monte Carlo simulation, to the discernment result time series data, in which discernment results from the stationarity discerning unit are arranged in the order of times used as references in discernment.

The flow rate prediction device according to the present example embodiment may further include a flow rate predicting unit. The flow rate predicting unit calculates a value of flow rate at time after latest time corresponding to a measured value included in the flow rate time series data or stochastic diffusion, which is stochastic expansion of the flow rate from the latest time to any given time, using the mixed model constructed by the model mixing unit.

The stationarity discerning unit may discern whether the state of fluctuation in the flow rate is a steady state or a non-steady state using a unit root test.

The mixing ratio fluctuation model may be represented by a probability distribution function that has a truncated distribution which is obtained by truncating a normal distribution with a mixing ratio at a previous time set to a mean value to the domain of the mixing ratio.

Figure 14:
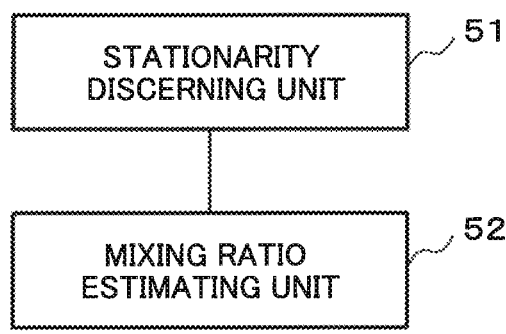
FIG. 14 is a block diagram illustrating a configuration example of a mixing ratio estimation device according to the example embodiment that serves as an outline of the present invention.

The mixing ratio estimation device according to the present example embodiment may include a stationarity discerning unit 51 and a mixing ratio estimating unit 52, as illustrated in FIG. 14. The stationarity discerning unit 51 and the mixing ratio estimating unit 52 may be the same as the above-described the stationarity discerning unit 51 and the mixing ratio estimating unit 52.

The present invention was described above through example embodiments and examples thereof. However, the present invention is not limited to the above example embodiments and examples. Various modifications that could be understood by a person skilled in the art may be applied to the configurations and details of the present invention within the scope of the present invention.

This application claims priority based on Japanese Patent Application No. 2014-157743, filed on Aug. 1, 2014, the entire disclosure of which is incorporated herein by reference.

INDUSTRIAL APPLICABILITY

The present invention is suitably applicable for the purpose of prediction of in data that are generated successively in time series and that may include a mixed state into which a steady state (steady process) and a non-steady state (non-steady process) are mixed as a characteristic concerning fluctuation in the data, and estimation of the fluctuation state thereof, in addition to a flow rate such as communication throughput.

REFERENCE SIGNS LIST

101 Data acquisition unit
51, 102 Stationarity discerning unit
52, 103 Mixing ratio estimating unit
1031 Particle filter application unit
1032 Mixing ratio fluctuation model storage unit
1033 Observation model storage unit
53, 104 Model mixing unit
105 Steady model storage unit
106 Non-steady model storage unit
107 Prediction model storage unit
108 Communication throughput prediction unit

What is claimed is:

1. A flow rate prediction device, comprising:
   hardware, including at least one processor and memory;
   a stationarity discerning unit implemented at least by the hardware and configured to discern whether a state of fluctuation in the flow rate is a steady state or a non-steady state based on flow rate time series data, the flow rate time series data being time series data of measured values of flow rate;
   a mixing ratio estimating unit implemented at least by the hardware and configured to estimate a mixing ratio of a steady state to a non-steady state both being included in the state of fluctuation in the flow rate at a specified time out of times corresponding to measured values included in the flow rate time series data by using a discernment result discerned by the stationarity discerning unit, a mixing ratio fluctuation model and a discernment result observation model, the mixing ratio fluctuation model modeling probabilistic fluctuation in a mixing ratio representing a proportion of a steady state to a non-steady state both being included in the state of fluctuation in the flow rate and the discernment result observation model indicating a probability of the discernment result discerned by the stationarity discerning unit being one predetermined state with respect to any mixing ratio; and
   a model mixing unit implemented at least by the hardware and configured to mix a steady model that represents fluctuation in the flow rate in a steady state and a non-steady model that represents fluctuation in the flow rate in a non-steady state to construct a mixed model that serves as a fluctuation model of the flow rate based on a mixing ratio estimated by the mixing ratio estimating unit, improving accuracy in predicting communication throughput or fluctuation, wherein
   the stationarity discerning unit discerns whether the state of fluctuation in the flow rate during a predetermined period defined using a specified time as a reference out of times corresponding to measured values included in the flow rate time series data is a steady state or a non-steady state, and
   the mixing ratio estimating unit, using the mixing ratio fluctuation model and the discernment result observation model that have been prepared in advance, applies a particle filter to discernment result time series data, the particle filter achieving Bayesion inference using Monte Carlo simulation, the discernment result time series data arranging discernment results from the stationarity discerning unit in the order of times used a references in discernment, to estimate a mixing ratio included in the state of fluctuation in the flow rate at a specified time.

2. The flow rate prediction device according to claim 1, further comprising:
   a flow rate predicting unit implemented at least by the hardware and configured to calculate a value of the flow rate at a time after a latest time corresponding to a measured value included in the flow rate time series data or stochastic diffusion that is stochastic expansion of the flow rate from the latest time to any given time using the mixed model constructed by the model mixing means.

3. The flow rate prediction device according to claim 1, wherein
   the stationarity discerning unit discerns whether the state of fluctuation in the flow rate is a steady state or a non-steady state using a unit root test.

4. The flow rate prediction device according to claim 1, wherein
   the mixing ratio fluctuation model is represented by a probability distribution function that has a truncated distribution that is obtained by truncating a normal distribution with a mixing ratio at a previous time set to a mean value to a domain of a mixing ratio.

5. A flow rate prediction method, the method comprising:
   discerning whether a state of fluctuation in the flow rate is a steady state or a non-steady state based on flow rate time series data ,the flow rate time series data being time series data of measured values of flow rate;
   estimating a mixing ratio of a steady state to a non-steady state both being included in the state of fluctuation in the flow rate at a specified time out of times corresponding to measured values included in the flow rate time series data by using the result of discernment, a mixing ratio fluctuation model and a discernment result observation model, the mixing ratio fluctuation model modeling probabilistic fluctuation in a mixing ratio representing a proportion of a steady state to a non-steady state both being included in the state of fluctuation in the flow rate and the discernment result observation model indicating a probability of a discernment result of the stationarity being one predetermined state with respect to any mixing ratio; and mixing a steady model that represents fluctuation in the flow rate in a steady state and a non-steady model that represents fluctuation in the flow rate in a non-steady state to construct a mixed model that serves as a fluctuation model of the flow rate based on the mixing ratio being estimated, improving accuracy in predicting communication throughput or fluctuation, wherein discerning whether the state of fluctuation is the steady state or the non-steady state discerns whether the state of fluctuation in the flow rate during a predetermined period defined using a specified time as a reference out of times corresponding to measured values included in the flow rate time series data is a steady state or a non-steady state, and estimating the mixing ratio applies, using the mixing ratio fluctuation model and the discernment result observation model that have been prepared in advance, a particle filter to discernment result time series data, the particle filter achieving Bayesian inference using Monte Carlo simulation, the discernment result time series data arranging discernment results from the stationarity discerning unit in the order of times used a references in discernment, to estimate a mixing ratio included in the state of fluctuation in the flow rate at a specified time.

6. A non-transitory computer-readable recording medium storing a flow rate prediction program, the program making a computer execute:

a process of discerning whether a state of fluctuation in the flow rate is a steady state or a non-steady state based on flow rate time series data, the flow rate time series data being time series data of measured values of flow rate;

a process of estimating a mixing ratio of a steady state to a non-steady state both being included in the state of fluctuation in the flow rate at a specified time out of times corresponding to measured values included in the flow rate time series data by using the discernment result, a mixing ratio fluctuation model and a discernment result observation model, the mixing ratio fluctuation model modeling probabilistic fluctuation in a mixing ratio representing a proportion of a steady state to a non-steady state both being included in the state of fluctuation in the flow rate, the discernment result observation model indicating a probability of a discernment result of the stationarity being one predetermined state with respect to any mixing ratio; and a process of mixing a steady model that represents fluctuation in the flow rate in a steady state and a non-steady model that represents fluctuation in the flow rate in a non-steady state to construct a mixed model that serves as a fluctuation model of the flow rate based on the estimated mixing ratio, improving accuracy in predicting communication throughput or fluctuation, wherein the process of discerning discerns whether the state of fluctuation in the flow rate during a predetermined period defined using a specified time as a reference out of times corresponding to measured values included in the flow rate time series data is a steady state or a non-steady state, and the the processing of estimating applies, using the mixing ratio fluctuation model and the discernment result observation model that have been prepared in advance, a particle filter to discernment result time series data, the particle filter achieving Bayesian inference using Monte Carlo simulation, the discernment result time series data arranging discernment results from the stationarity discerning unit in the order of times used a references in discernment, to estimate a mixing ratio included in the state of fluctuation in the flow rate at a specified time.

* * * * *